US012065150B2

(12) United States Patent
Masuda et al.

(10) Patent No.: US 12,065,150 B2
(45) Date of Patent: Aug. 20, 2024

(54) BEHAVIOR RECOGNITION APPARATUS AND BEHAVIOR RECOGNITION METHOD

(71) Applicant: DENSO CORPORATION, Kariya (JP)

(72) Inventors: Masaki Masuda, Kariya (JP); Kaname Ogawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 313 days.

(21) Appl. No.: 17/717,484

(22) Filed: Apr. 11, 2022

(65) Prior Publication Data

US 2022/0242418 A1     Aug. 4, 2022

Related U.S. Application Data

(63) Continuation of application No. PCT/JP2020/038149, filed on Oct. 8, 2020.

(30) Foreign Application Priority Data

Oct. 16, 2019 (JP) .................................. 2019-189632
Jan. 10, 2020 (JP) .................................. 2020-003134

(51) Int. Cl.
*B60W 40/09* (2012.01)
*G06V 20/59* (2022.01)
*G06V 40/16* (2022.01)

(52) U.S. Cl.
CPC .......... *B60W 40/09* (2013.01); *G06V 20/597* (2022.01); *G06V 40/168* (2022.01); *B60W 2540/225* (2020.02)

(58) Field of Classification Search
CPC ...... B60W 40/02; B60W 40/08; B60W 40/09; B60W 30/18163; B60W 50/10;
(Continued)

(56) References Cited

U.S. PATENT DOCUMENTS

2016/0159366 A1* 6/2016 Tsuyunashi .............. G08G 1/16
                                                              340/439
2017/0083751 A1    3/2017 Tuzel et al.
(Continued)

FOREIGN PATENT DOCUMENTS

CN    107531249 A  *  1/2018  ............. B60K 28/06
JP    2010204984 A     9/2010
(Continued)

OTHER PUBLICATIONS

English translation of CN-107531249 (Year: 2018).*
(Continued)

*Primary Examiner* — Russell Frejd
*Assistant Examiner* — Brandon Z Willis
(74) *Attorney, Agent, or Firm* — Harness, Dickey & Pierce, P.L.C.

(57) ABSTRACT

In a behavior recognition apparatus, a secondary informational item is generated for a corresponding target state of one or more than one target state extracted from each primary informational item acquired. The secondary informational item is represented by two different values, which express respectively (i) corresponding to the target state and (ii) not corresponding to the target state, the two different values being enabled to be added or subtracted. Further, a behavior vector is updated using a determination information group extracted by using a time window from a plurality of the secondary informational items in time series, and the driving behavior of the driver is recognized using the updated behavior vector.

11 Claims, 10 Drawing Sheets

(58) Field of Classification Search
CPC ..... B60W 2540/225; B60W 2540/229; B60W 2540/30; B60W 2420/403; B60W 2556/10; G06V 10/766; G06V 20/59; G06V 20/597; G06V 40/10; G06V 40/16; G06V 40/168; G06V 40/18; G06T 7/00; G06T 7/20; G08G 1/16

See application file for complete search history.

(56) References Cited

U.S. PATENT DOCUMENTS

| | | | | |
|---|---|---|---|---|
| 2018/0254106 | A1* | 9/2018 | Mori | G06N 20/00 |
| 2020/0286358 | A1 | 9/2020 | Doi et al. | |
| 2020/0369282 | A1* | 11/2020 | Yokota | B60W 40/10 |

FOREIGN PATENT DOCUMENTS

| | | | |
|---|---|---|---|
| JP | 2018520444 A | | 7/2018 |
| JP | 2019113925 A | | 7/2019 |
| JP | 2020126573 A | * | 8/2020 |

OTHER PUBLICATIONS

English translation of JP-2020126573 (Year: 2020).*
Sujitha Martin and Mohan M. Trivedi, "Gaze Fixation and Dynamics for Behavior Modeling and Prediction of On-road Driving Maneuvers," 2017 IEEE Intelligent Vehicles Symposium (IV), Jun. 11-14, 2017, USA.
Vahid Kazemi and Jesephine Sullivan, "One Millisecond Face Alignment with an Ensemble of Regression Trees," 2014 IEEE Conference on Computer Vision and Pattern Recognition, Jun. 23-28, 2014, USA.
Sujitha Martin, Sourabh Vora, Kevan Yuen, Mohan M. Trivedi, and IEEE member "Dynamics of driver's Gaze: Explorations in Behavior Modeling and Maneuver Prediction," IEEE Transactions on Intelligent Vehicles, vol. 3, No. 2, Jun. 2018, USA.
Jerome H. Friedman, "Greedy Function Approximation : A gradient boosting machine," The Annals of Statistics vol. 29, No. 5, 1189-1232, 2001.

* cited by examiner

BEHAVIOR RECOGNITION APPARATUS AND BEHAVIOR RECOGNITION METHOD

CROSS REFERENCE TO RELATED APPLICATIONS

The present application is a continuation application of International Patent Application No. PCT/JP2020/038149 filed on Oct. 8, 2020, which designated the U.S. and claims the benefit of priority from Japanese Patent Application No. 2019-189632 filed on Oct. 16, 2019 and Japanese Patent Application No. 2020-003134 filed on Jan. 10, 2020. The entire disclosures of all of the above applications are incorporated herein by reference.

TECHNICAL FIELD

The present disclosure relates to a technique for recognizing a driving behavior from a state of a driver.

BACKGROUND

There is described a technology that generates an average model in advance for each driving behavior as a recognition target by collecting and analyzing time-series data representing the movement of the driver's line of sight, and recognizes each driving behavior by comparing the time series data detected during driving with the average model. The model is represented by a feature vector with respect to each of visual regions, which are defined as a plurality of regions that are gazed by the driver. The respective elements of the feature vector are associated with features such as the time ratio or frequency of viewing each visual region within a predetermined time, the maximum gaze time, and the frequency of movement between visual regions. In addition, the time series data as an analysis target is also subjected to filtering processing such as noise removal.

SUMMARY

According to an example of the present disclosure, a behavior recognition apparatus is provided as follows. In the behavior recognition apparatus, a secondary informational item is generated for a corresponding target state of one or more than one target state extracted from each primary informational item acquired. The secondary informational item is represented by two different values, which express, respectively, (i) corresponding to the target state and (ii) not corresponding to the target state, the two different values being enabled to be added or subtracted. Further, a behavior vector is updated using a determination information group extracted by using a time window from a plurality of the secondary informational items in time series, and the driving behavior of the driver is recognized using the updated behavior vector.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

Hereinafter, embodiments of the present disclosure will be described with reference to the drawings.

It is noted that in the present application, "information" that is primarily uncountable may be used additionally as being countable. In order to explicitly indicate "information" being singular, "informational item" may be used; in order to explicitly indicate "information" being plural, "a plurality of information" or "informational items" may be used.

Further it is noted that in the present application, "at least one of A, B, and C" or "at least one selected from A, B, and C" may be defined as being equivalent to "(i) A alone, or (ii) B alone, or (iii) C alone, or (iv) any combination of A, B, and C"; in addition, "any combination of A, B, and C" may be defined as being equivalent to "(i) A and B, or (ii) A and C, or (iii) B and C, or (iv) A, B, and C".

Yet further, it is noted that in the present application, for instance, "at least one state selected from three states that are a first state, a second state, and a third state" may be defined as being equivalent to "(i) a first state alone, or (ii) a second state alone, or (iii) a third state alone, or (iv) any combination of a first state, a second state, and a third state"; in addition, "any combination of a first state, a second state, and a third state" may be defined as being equivalent to "(i) a first state and a second state, or (ii) a first state and a third state, or (iii) a second state and a third state, or (iv) a first state, a second state, and a third state". Furthermore, in the foregoing, "state" may be replaced by any word such as "informational item", or "behavior".

1. Configuration

Figure 1:
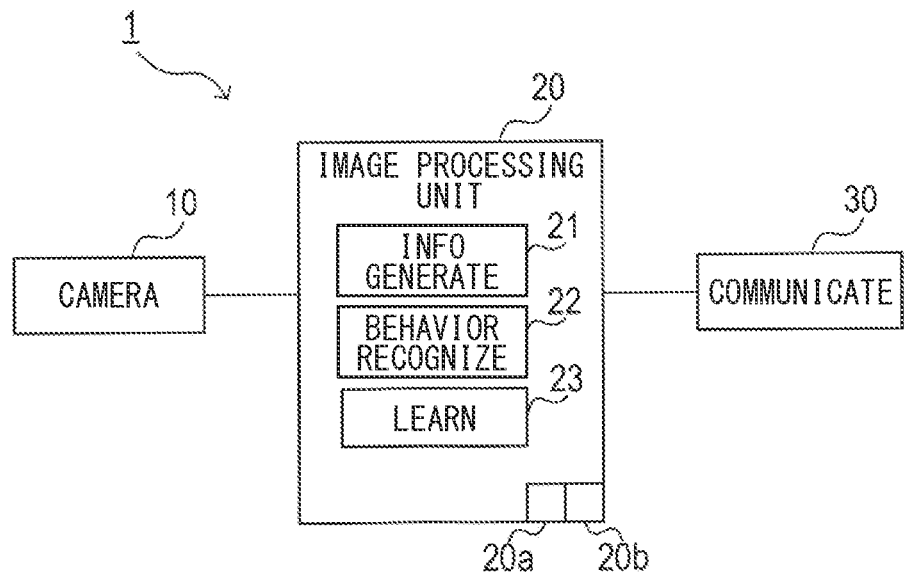
FIG. 1 is a block diagram showing a configuration of a behavior recognition apparatus.

A behavior recognition apparatus 1 shown in FIG. 1 is mounted on a vehicle and recognizes the driving behavior that the driver is trying to execute, from various information acquired in the vehicle. The behavior recognition apparatus 1 includes a camera 10 and an image processing unit 20. The behavior recognition device 1 may include a communication unit 30.

The camera 10 includes a CCD image sensor, and a CMOS image sensor. The camera 10 is arranged such that the imaging range covers the face of the driver seated in the driver's seat of the vehicle. The camera 10 periodically captures images and outputs the captured image data to the image processing unit 20.

The communication unit 30 acquires various information by communicating with electronic control units provided in each part of the vehicle via an in-vehicle communication network. The in-vehicle communication network uses CAN. CAN is a registered trademark. The information acquired by the image processing unit 20 via the communication unit 30 may include vehicle information and peripheral information.

The vehicle information is information representing a state of the vehicle. The vehicle information may include, for example, vehicle speed, steering angle, yaw rate, acceleration, accelerator pedal operation amount, brake pressure, and the like. That is, the vehicle information may include not only information representing the behavior of the vehicle but also information affecting the behavior of the vehicle.

The peripheral information is state information representing the situation around the vehicle. The peripheral information includes (i) images from cameras that capture the peripheral of the vehicle and (ii) detection results from millimeter-wave radar, rider, ultrasonic sensor, etc. that detects an object around the vehicle. Further, the peripheral information may include the information obtained by analyzing the images and detection results.

The image processing unit 20 includes a microcomputer having a CPU 20a and, for example, a semiconductor memory (hereinafter, a memory 20b) such as a RAM and a ROM. The image processing unit 20 includes an information generation unit 21, a behavior recognition unit 22, and a learning unit 23 as functional blocks corresponding to the functions realized by the processing executed by the image processing unit 20. The image processing unit 20 including the information generation unit 21 corresponds to an information generation apparatus.

2. Information Generation Process

Figure 2:
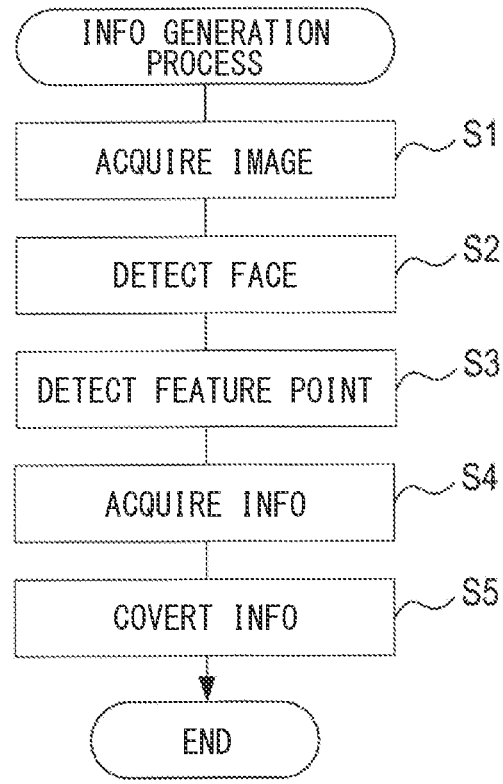
FIG. 2 is a flowchart of an information generation process.

The information generation process executed by the image processing unit 20 in order to realize the function as the information generation unit 21 will be described with reference to the flowchart of FIG. 2. The information generation process is repeatedly started at a preset cycle.

In S1, the image processing unit 20 acquires an image from the camera 10.

Figure 3:
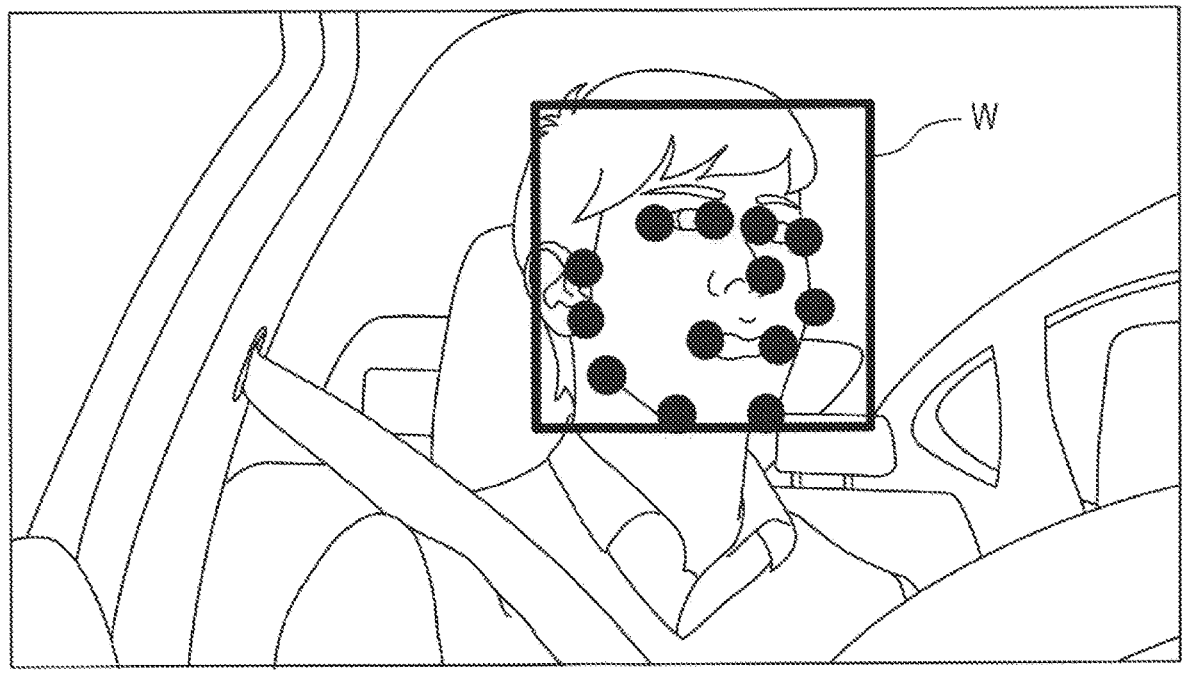
FIG. 3 is an explanatory diagram showing an acquired image and results of face detection and face feature point detection.

In the following S2, the image processing unit 20 executes a face detection process. The face detection process is a process of detecting a face region, which is a region in which a face is captured, from the image acquired in S1. In the face detection process, for example, pattern matching can be used, but the face detection process is not limited to the pattern matching. As a result of the face detection process, for example, the portion indicated by the frame W in FIG. 3 is detected as a face region.

In the following S3, the image processing unit 20 executes a feature point detection process. The feature point detection process is a process of detecting a plurality of facial feature points necessary for specifying the captured face orientation and eye condition using the image of the face region extracted in S2. The facial feature points include characteristic parts in at least one contour of the eyes, nose, mouth, ears, and face. As a result of the feature point detection process, for example, a plurality of facial feature points indicated by solid circles in FIG. 3 are detected.

Figure 13:
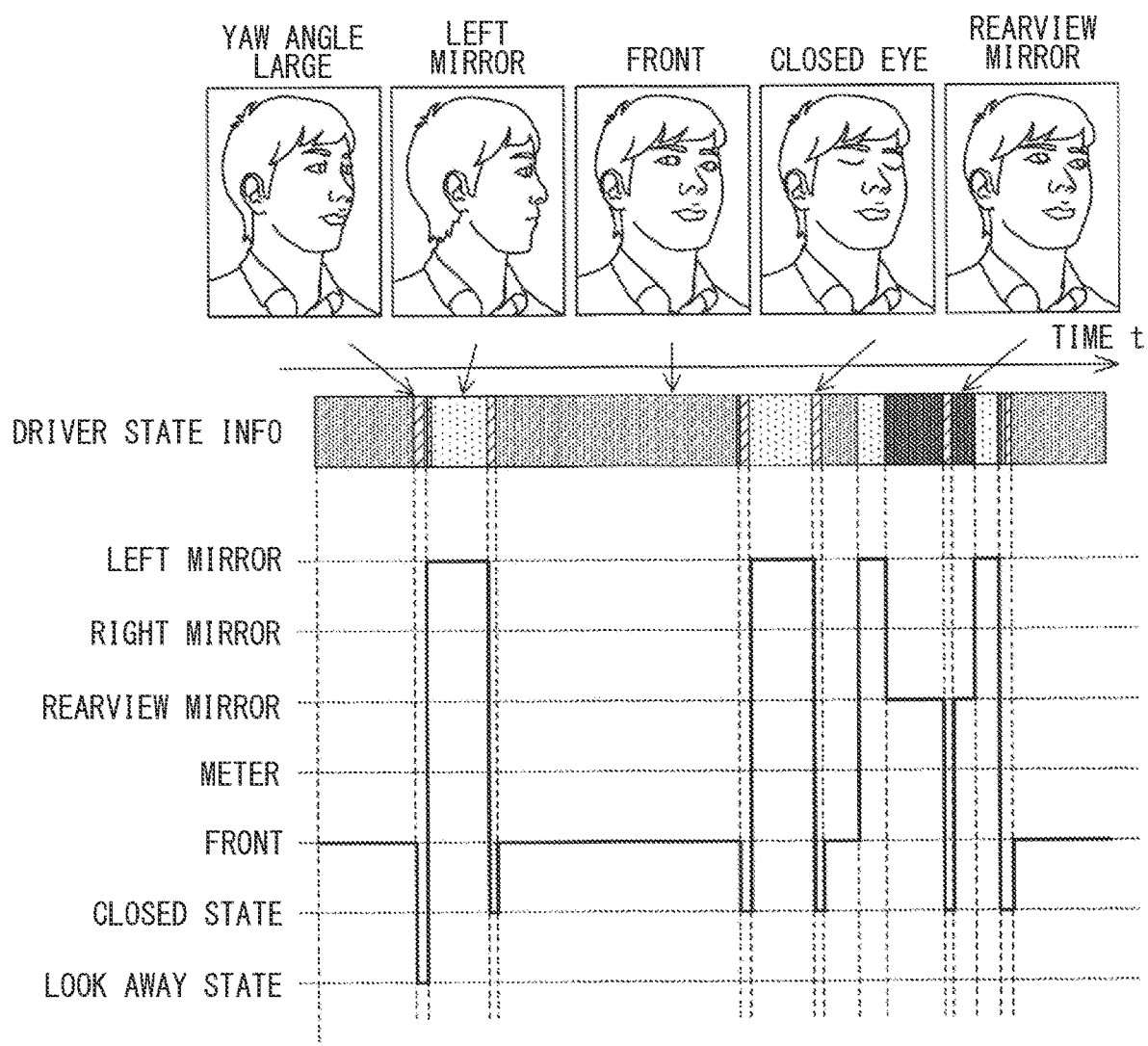
FIG. 13 is an explanatory diagram illustrating a driver state and time-series data of driver state information.

In the following S4, the image processing unit 20 executes an information acquisition process. The information acquisition process is a process of generating driver state information indicating the driver state by using the peripheral image of the eyes detected from the image of the face region based on the plurality of facial feature points detected in S3. The driver state information, which may also be referred to as an informational item on a state of a driver of a vehicle, corresponds to primary information, which may also be referred to as a primary informational item. As shown in FIG. 13, the driver state information has a plurality of signal levels. The respective signal levels are associated with the driver's gaze direction, the driver's eye open/closed state (for example, the eye closed state), the driver's face looking away state, or the like. That is, the signal levels indicated by the driver state information respectively represent corresponding target states. The driver state information is thus multi-valued information indicating which one of target states the driver state corresponds to.

Figure 4:
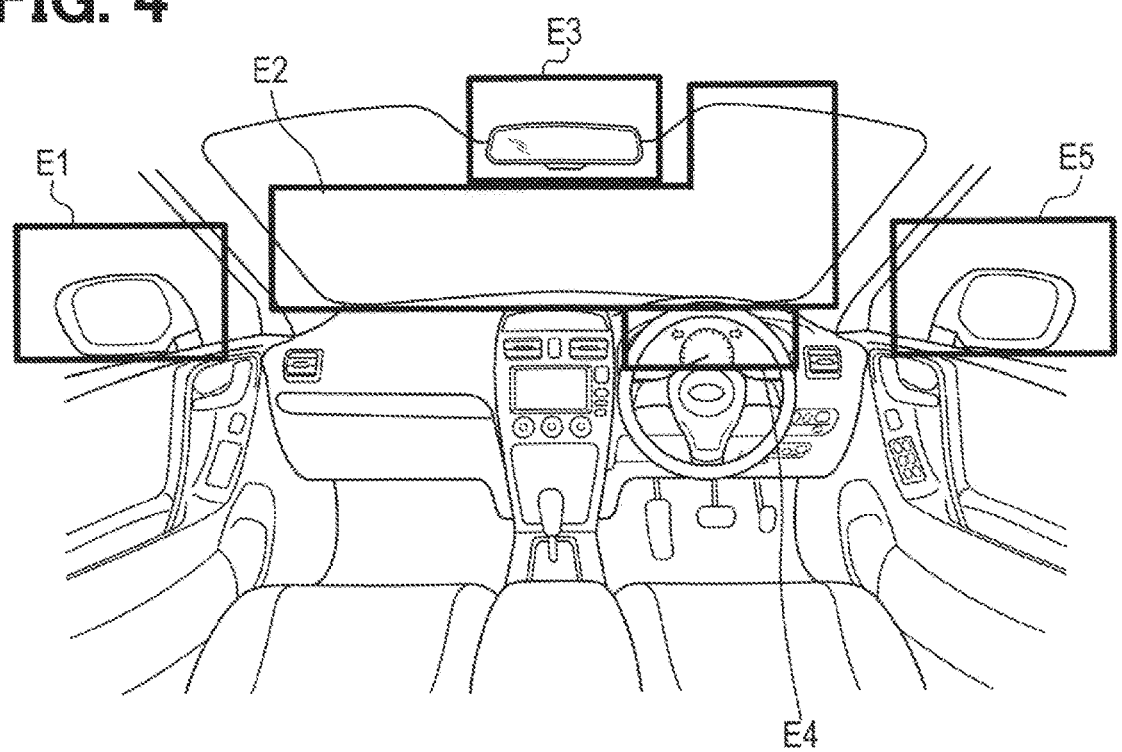
FIG. 4 is an explanatory diagram showing visual regions.

The range visually recognized by the driver during driving is divided into a plurality of regions (hereinafter, visual regions). The driver's gaze direction is expressed by which one of the visual regions the driver is gazing at. As shown in FIG. 4, the visual regions include a left side mirror (hereinafter, left mirror) E1, a front E2, a rearview mirror E3, a meter E4, and a right side mirror (hereinafter, right mirror) E5. However, the method of dividing the region visually recognized by the driver during driving is not limited to the above-mentioned E1 to E5. A finer divided visual regions may be used, or a visual regions divided according to an angle or the like viewed from the driver may be used.

The closed eye state of the driver represents a state in which the driver is not looking at any visual region due to the closed eyes. The face looking away state of the driver represents a state in which the face orientation is separated from the front direction by a predetermined angle or more. That is, it represents a state of looking away, in which the driver is gazing at a region other than the above-mentioned visual regions.

In the following S5, the image processing unit 20 executes an information conversion process and ends the process. The information conversion process is a process of converting each of the plurality of signal levels indicated by the driver state information generated in S4 into individual state information represented by two values of 1 corresponding to the signal level and 0 not corresponding to the signal level. The information conversion process then accumulates the conversion result in the memory 20b. The individual state information corresponds to the secondary information, which may also be referred to as the secondary informational item.

Figure 5:
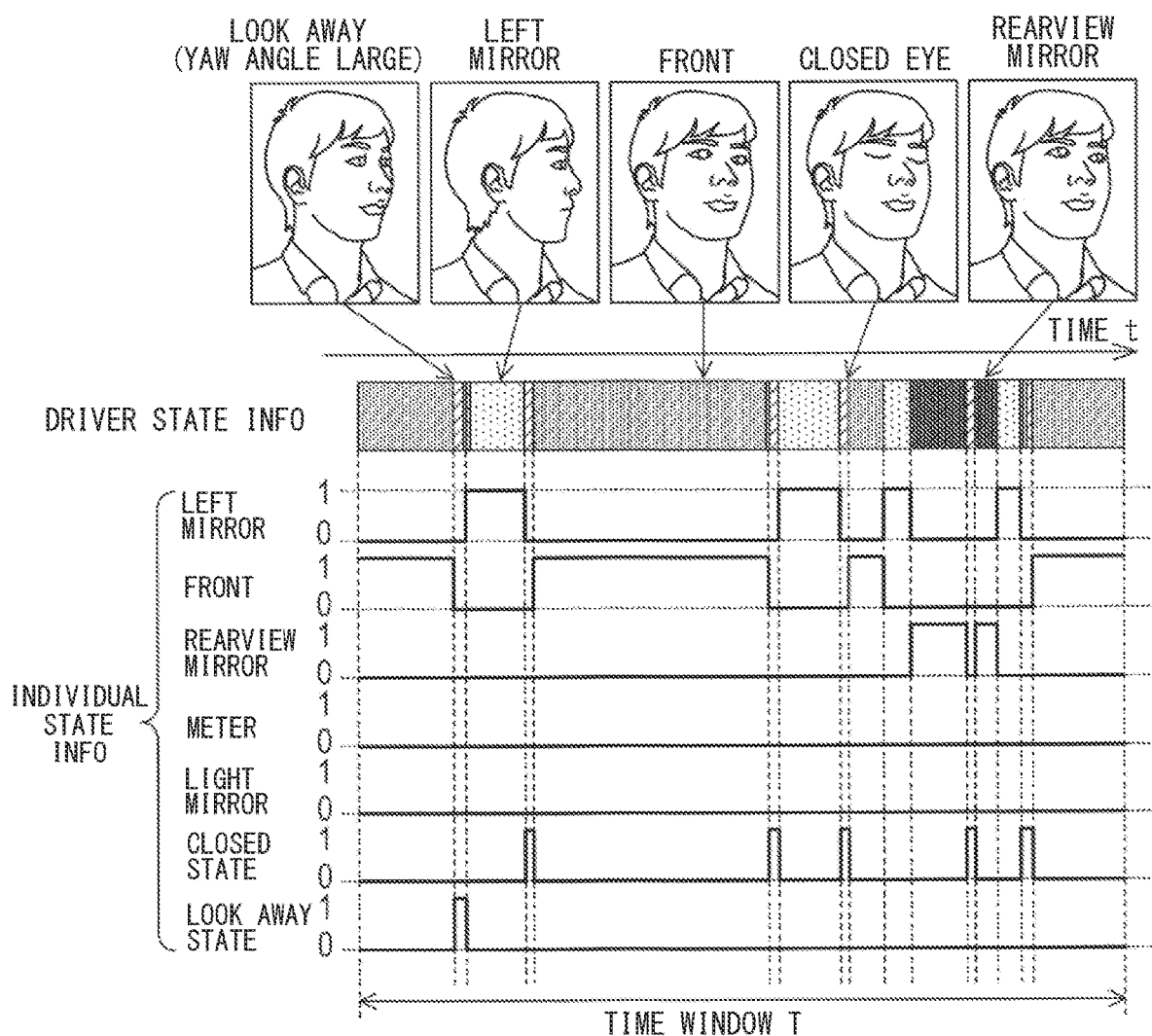
FIG. 5 is an explanatory diagram illustrating a driver state, driver state information, and time-series data of individual state information.

As shown in FIG. 5, the individual state information regarding the gaze direction of the driver is represented by a binary value of 1 when it is determined that the person is gazing at the corresponding visual region, and 0 in other cases. The individual state information regarding the driver's eye-closed state is represented by a binary value of 1 when the driver's eyes are closed and 0 in other cases. The individual state information regarding the face looking away state of the driver is represented by a binary value of 1 when the face orientation angle is equal to or greater than a predetermined angle with respect to the front direction, and 0 in other cases. At an arbitrary time point, one of a plurality of individual state information generated from the driver state information is selectively set to 1, and the other ones of the plurality of individual state information are set to 0.

The processing of S3 and S4 can use, for example, the method proposed by the applicant of the present application in Japanese Patent Application No. 2019-108028, the disclosure of which is incorporated herein by reference, to detect feature points and gaze directions using a regression function. Further, S4 corresponds to an information acquisition unit and S5 corresponds to an information conversion unit.

By repeating the information generation process, a plurality of individual state information in time series are accumulated in the memory 20b for each target state (that is, the signal level of the driver state information).

3. Driving Behavior Recognition

3-1. Overview

The following will describe a method used in the behavior recognition process, that is, a method of recognizing the driving behavior that the driver is trying to execute from a time series of a plurality of individual state information generated by the information generation unit 21. The behavior recognition process is a process executed by the image processing unit 20 in order to realize the function as the behavior recognition unit 22.

The driving behavior as a recognition target to be recognized may include, for example, "going straight", "lane changing to left", "lane changing to right", "turning to left", "turning to right", "branching to left", "branching to right", "merging", "stopping", etc.

Figure 6:
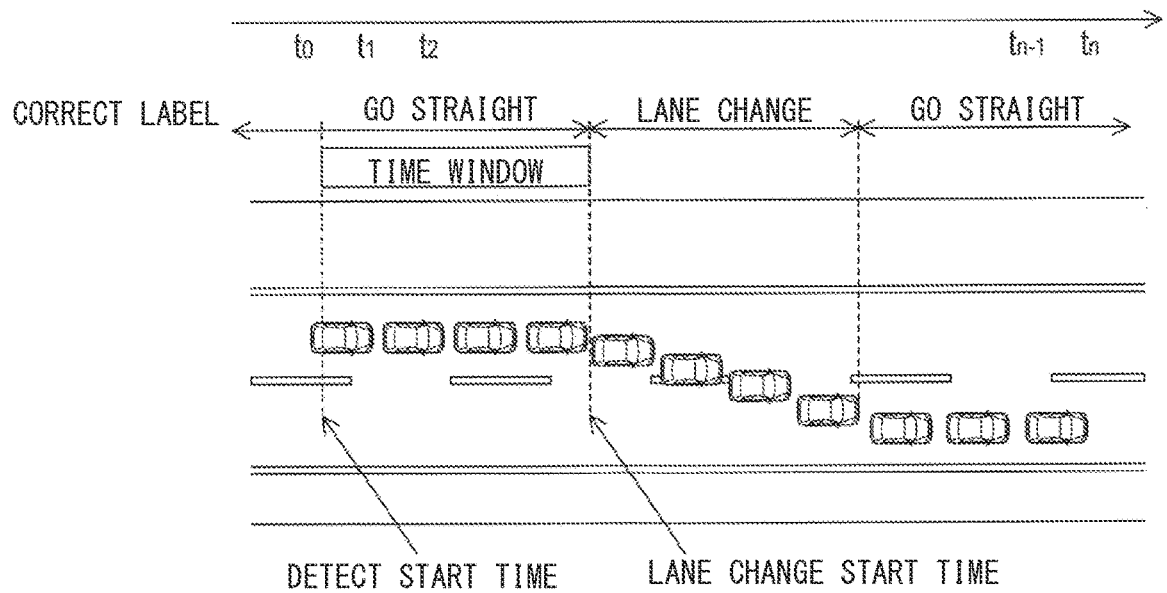
FIG. 6 is an explanatory diagram relating to the setting of a time window.

The behavior recognition process uses a determination information group $I_E$ that is cut out from the time series of a plurality of individual state information using the time window T. As shown in FIG. 6, the time window T is set to a time width equal to or longer than the time length from the time at which the driving behavior as a recognition target to be recognized is desired to be detected to the time at which the driving behavior is actually started. FIG. 5 is an example of the determination information group $I_E$ cut out by the time window T.

Figure 7:
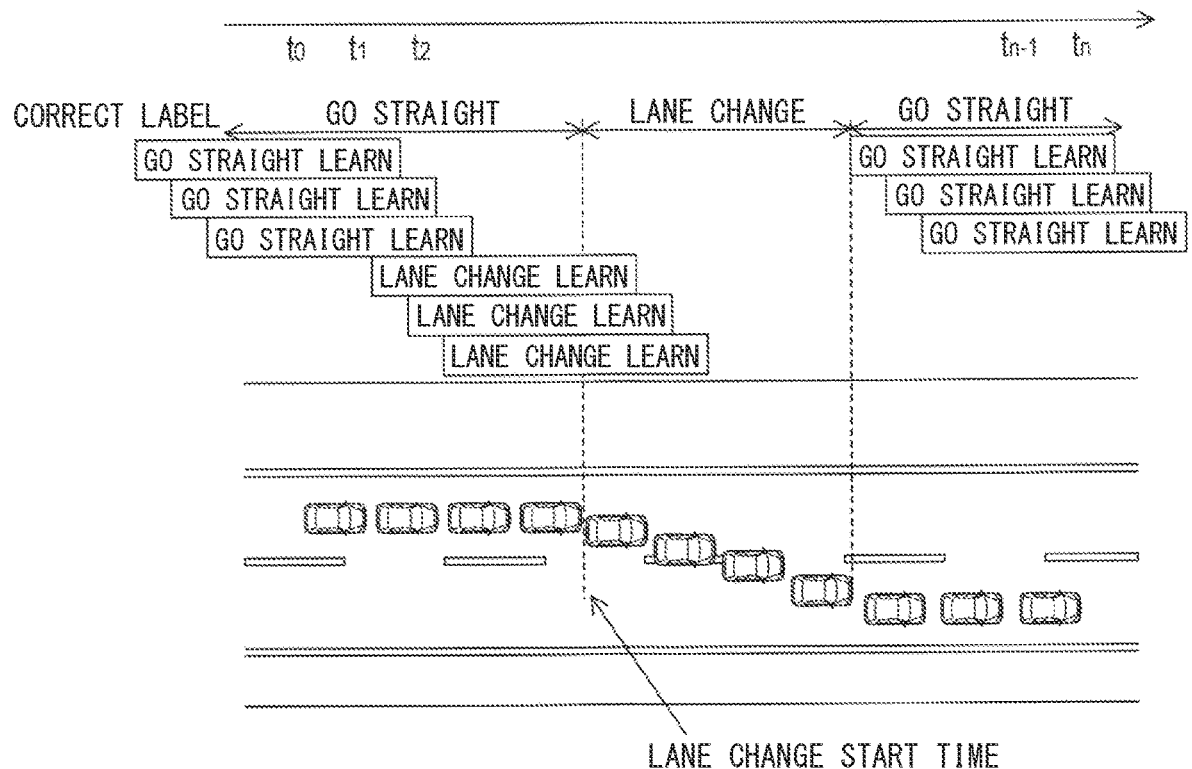
FIG. 7 is an explanatory diagram relating to cutting out learning data.

As shown in FIG. 7, the determination information group $I_E$ is continuously extracted using a so-called sliding window in which the time window T is applied while shifting the time by one or several frames of images. The behavior recognition process is executed for each of the plurality of determination information group $I_E$ extracted in this way.

Here, a vector having D elements $a_1$ to $a_D$ is called a score vector A. D is the same number as a total number of driving behaviors as a recognition target to be recognized. The score vector A is represented by Expression (1), and the elements $a_1$ to $a_D$ are respectively associated with the corresponding driving behaviors. The score vector A takes a one-hot format in which the value of an element corresponding to a first driving behavior is large and the value of an element not corresponding to the first driving behavior is small. The first driving behavior associated with the element having the largest value becomes a recognition result. The score vector A corresponds to a behavior vector.

[Expression (1)]

$$A = [a_1 a_2 \ldots a_D]^T \quad (1)$$

In the behavior recognition process, as shown in Expression (2), the initial value $A^{(0)}$ of the score vector is given, and the score vector A is corrected by the correction amount R to calculate the score vector A representing the driving behavior that the driver is trying to execute.

[Expression (2)]

$$A = A^{(0)} + R \quad (2)$$

As shown in Expression (3), the correction amount R is obtained by inputting on the correction function $F_K$ with the initial value A (0) of the score vector and the determination information group $I_E$ cut out by the time window T as input information. The correction function $F_K$ is a function to which an additive model of a regression function using gradient boosting is applied. Such a regression function is indicated, for example, by the followings. Reference 1: "One Millisecond Face Alignment with an Ensemble of Regression Trees" Vahid Kazemi and Josephine Sullivan, The IEEE Conference on CVPR, 2014, 1867-1874. Reference 2: "Greedy Function Approximation: A gradient boosting machine" Jerome H. Friedman, The Annals of Statistics Volume 29, Number 5 (2001), 1189-1232. The disclosures of Reference 1 and Reference 2 are incorporated herein by reference.

[Expression (3)]

$$R = F_K(I_E, A^{(0)}) \quad (3)$$

The correction function $F_K$ is a function whose value is recursively determined using K regression trees $RT_1$ to $RT_K$ prepared in advance, and is defined by Expression (4). Regression trees $RT_1$ to $RT_K$ are a set of weak hypotheses that have a tree structure. $F_0$ is the initial value of the correction function $F_K$, $G_k$ is the regression function whose value is determined by the regression tree $RT_k$ identified by k, and k=1, 2, ... K. Further, $\gamma$ is a learning rate and is set to $0<\gamma<1$. By reducing the value of $\gamma$, overfitting is suppressed.

[Expression (4)]

$$F_K(I_E, A^{(0)}) = F_0 + \gamma \sum_{k=1}^{K} G_k(I_E, A^{(0)}) \quad (4)$$

Figure 8:
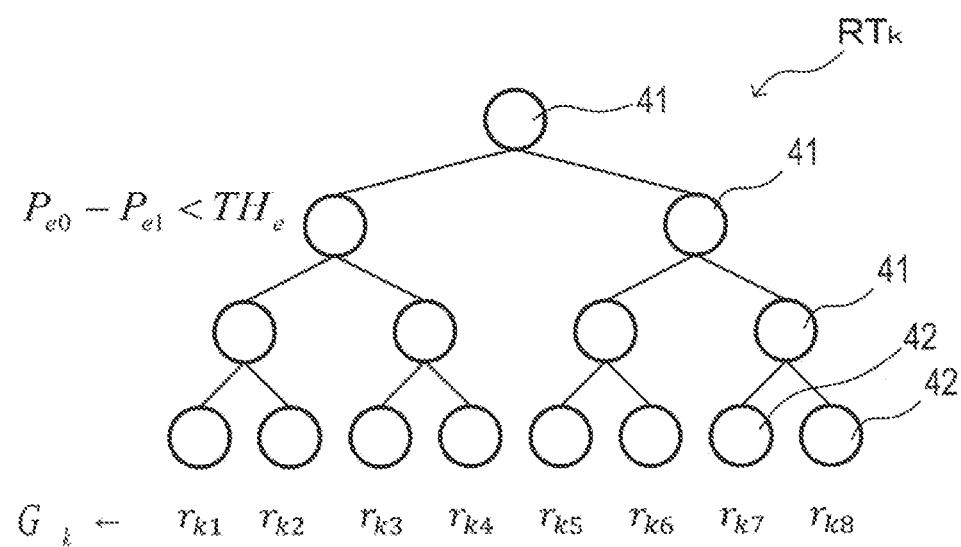
FIG. 8 is an explanatory diagram illustrating a regression tree.

The K regression trees $RT_1$ to $RT_K$ all have the same structure. For example, as shown in FIG. 8, the regression tree $RT_k$ uses a binary tree that sequentially branches the node into two. The node that becomes the branch point of the branch of the regression tree $RT_k$ is called a normal node 41, and the node that becomes the leaf of the regression tree $RT_k$ is called a terminal node 42. Assuming that the node index that identifies the normal node 41 is e, a pair of comparison data ($P_{e0}$, $P_{e1}$) and the threshold $TH_e$ are associated with the e-th normal node 41. Specific values $r_{k1}$ to $r_{k8}$ of the regression amount $G_k$ are associated with each of the terminal nodes 42.

Figure 9:
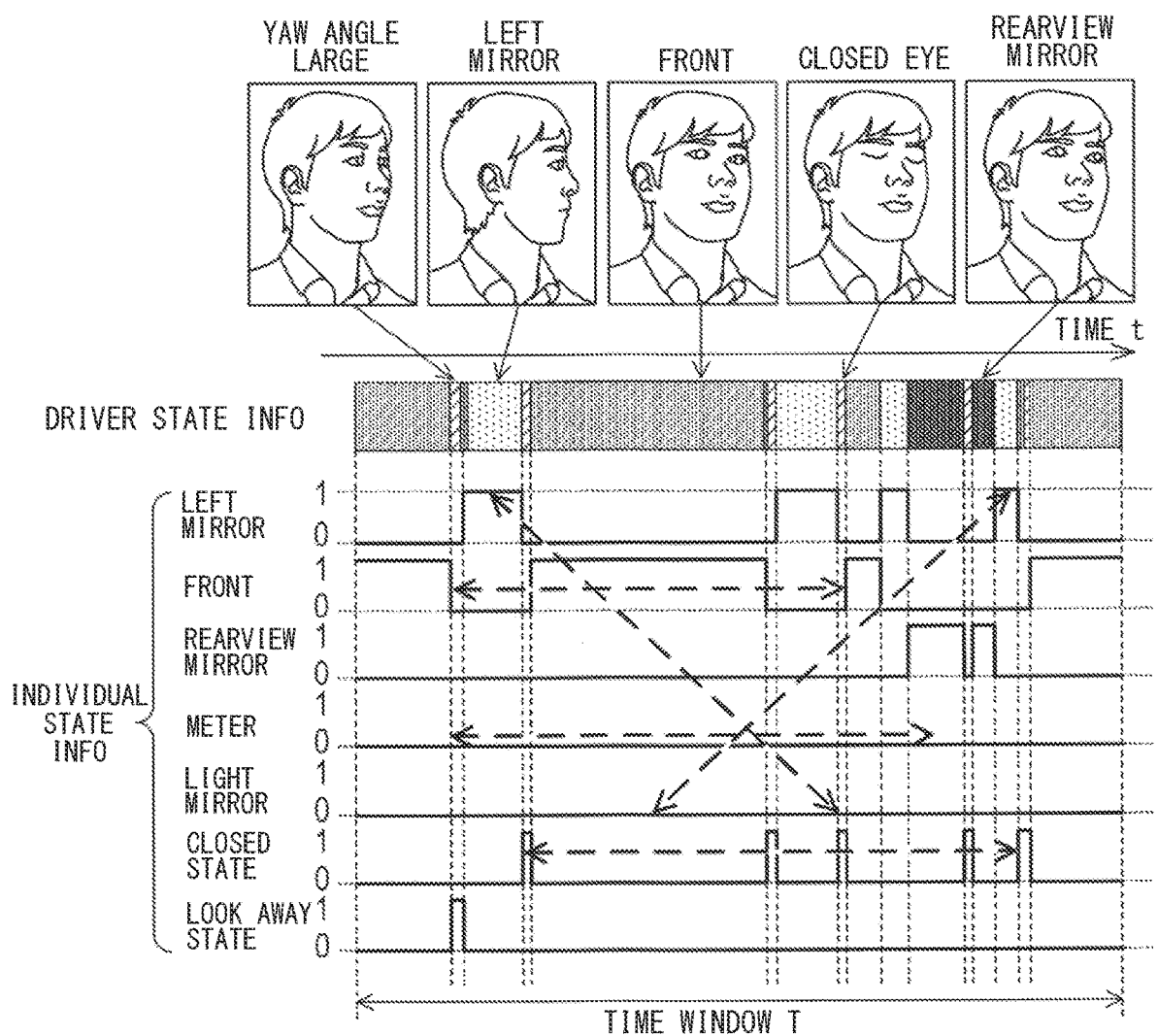
FIG. 9 is an explanatory diagram relating to a pair of comparison data used in a regression tree.

The two data belonging to the pair of comparison data ($P_{e0}$, $P_{e1}$) are defined by the type of individual state information and the extraction time represented by the relative time based on the start time of the time region cut by the time window. As shown in FIG. 9, the types of individual state information may be different or the same between the two data. Also, the extraction time may be different or the same between the two data. Note that if the types of individual state information are the same between the two data, it is necessary to make the extraction time different. Conversely, if the extraction time is the same between the two data, it is necessary to make the types of individual state information different. Both ends of the bold dashed arrow shown in FIG. 9 correspond to the two data extracted as the pair of comparison data ($P_{e0}$, $P_{e1}$).

In each normal node 41 of the regression tree $RT_k$, selecting which branch to the normal node 41 or the terminal node 42 in the next layer is determined depending on whether the difference value (i.e., $P_{e0}-P_{e1}$) of the pair of comparison data ($P_{e0}$, $P_{e1}$) is lower than the threshold $TH_e$. Since the values of the individual data constituting the pair of comparison data ($P_{e0}$, $P_{e1}$) are all 0 or 1, the difference value is any one of −1, 0, or 1. That is, the threshold $TH_e$ is set to −1<$TH_e$≤1. The difference value of the pair of comparison data ($P_{e0}$, $P_{e1}$) corresponds to a feature (i.e., feature amount) extracted from the determination information group $I_E$.

According to the comparison result between the difference value of the pair of comparison data ($P_{e0}$, $P_{e1}$) associated with the normal node 41 of the regression tree $RT_k$ and the threshold $TH_e$, the same process is repeated while tracing the branches of the regression tree $RT_k$, to thereby reach any of the terminal nodes 42. The regression amount $r_{kj}$ associated with the reached terminal node 42 becomes the value of the regression function $G_k$, and eventually becomes a part of the output value of the correction function $F_K$. In FIG. 8, j=1, 2, . . . 8.

As described above, in the behavior recognition process, the initial value $A^{(0)}$ of the score vector A, the initial value $F_0$ of the correction function $F_K$, and each parameter defining the regression tree $RT_k$ need to be prepared in advance. In the following, the initial value $A^{(0)}$ of the score vector A, the initial value $F_0$ of the correction function $F_K$, and each parameter that defines the regression tree $RT_k$ are collectively referred to as behavior recognition parameters.

The behavior recognition parameters are generated when the image processing unit 20 executes the learning process. Note that the learning process does not necessarily have to be executed by the image processing unit 20, and may be executed by a device other than the image processing unit 20.

3-2. Learning

Figure 10:
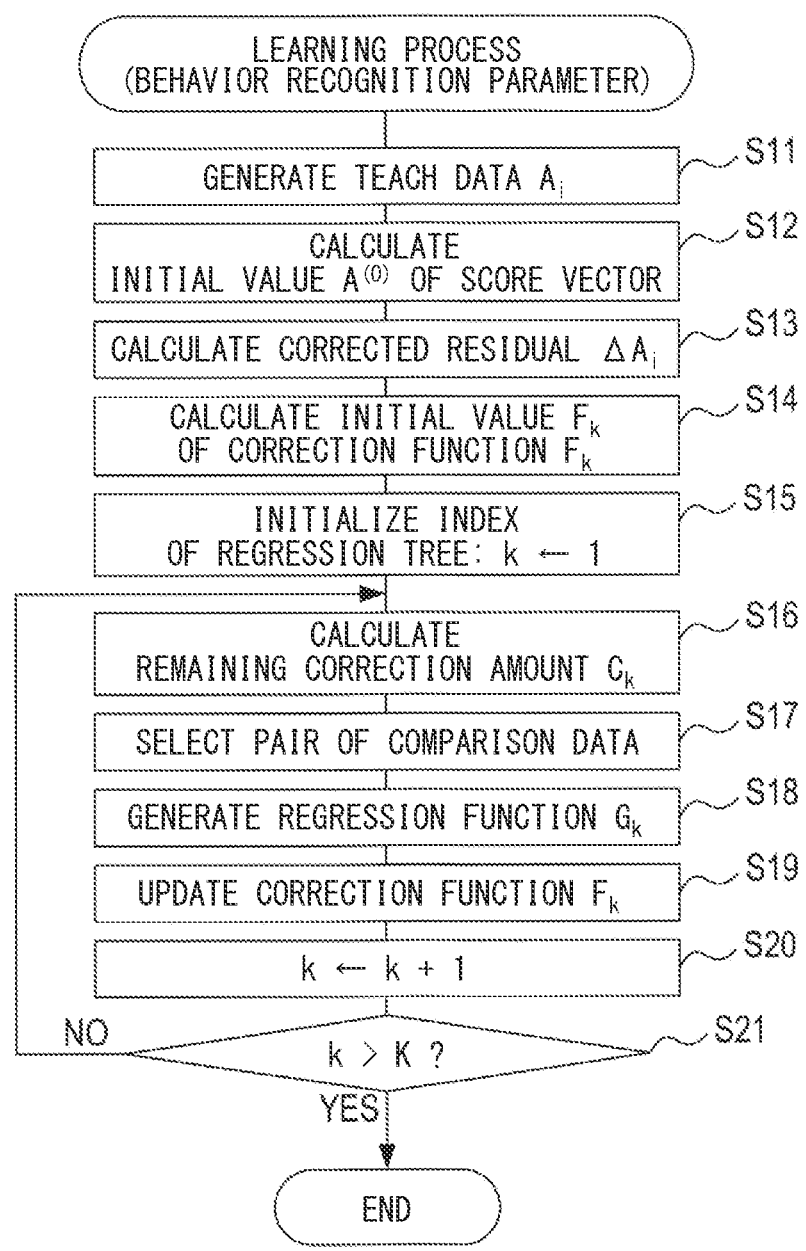
FIG. 10 is a flowchart of a learning process for generating a behavior recognition parameter.

The learning process for setting the behavior recognition parameters will be described with reference to the flowchart of FIG. 10. The learning process is a process executed by the image processing unit 20 in order to realize the function as the learning unit 23. When the learning process is executed, the individual state information for learning is stored in the memory 20b. The individual state information for learning is given a correct label of the driver's driving behavior in advance in units of one frame of image.

In S11, the image processing unit 20 generates correct answer values (hereinafter, teacher data) $A_1$ to $A_N$ of the score vector A for each learning information. The learning information is a large number (for example, N) of individual state information groups cut out from the individual state information for learning stored in the memory 20b using a time window.

Specifically, as shown in FIG. 7, the teacher data Ai is generated with reference to the correct answer label assigned to each frame of the image included in the learning information. For example, if "going straight" is assigned as a correct answer label to all frames of the images included in the learning information, the teacher data Ai is generated in which the element associated with the "going straight" of the score vector A is set to 1 and the other elements are set to 0. Also, if the frame of the image included in the learning information includes the start point of the lane changing to left, the teacher data Ai is generated in which the element associated with the "lane changing to left" of the score vector A is set to 1 and the other elements are set to 0.

In the following S12, the image processing unit 20 calculates the initial value $A^{(0)}$ of the score vector. The initial value $A^{(0)}$ of the score vector may use, for example, the average value of the teacher data $A_1$ to $A_N$ generated in S11.

In the following S13, the image processing unit 20 calculates the corrected residual $\Delta A_i$ which is the difference between the teacher data $A_i$ and the initial value $A^{(0)}$ of the score vector, for each learning information according to Expression (5).

[Expression (5)]

$$\Delta A_i = A_i - A^{(0)} \tag{5}$$

In the following S14, the image processing unit 20 calculates the initial value $F_0$ of the correction function $F_K$ used for calculating the correction amount R by using Expression (6).

[Expression (6)]

$$F_0 = \underset{V}{\mathrm{argmin}} \sum_{i=1}^{N} \|\Delta A_i - V\|^2 \tag{6}$$

Expression (6) signifies that when the distance between (i) the corrected residual $\Delta A_i$ in each learning information and (ii) any vector V having the same dimension as the score vector A is totaled for all the learning information, the vector V that minimizes the total value is set as the initial value $F_0$ of the correction function $F_K$.

In the following S15, the image processing unit 20 initializes the regression tree index k used for identifying the regression trees $RT_1$ to $RT_K$ to 1.

In the following S16, the image processing unit 20 calculates the remaining correction amount $c_k$ for each learning information using Expression (7).

[Expression (7)]

$$c_k = \Delta A_i - F_{k-1}(I_E, A^{(0)}) \tag{7}$$

In the following S17, the image processing unit 20 selects the pair of comparison data ($P_{e0}$, $P_{e1}$) to be used for generating the regression tree $RT_k$ by using the learning information. For the selection of the pair of comparison data ($P_{e0}$, $P_{e1}$) and the generation of the regression tree $RT_k$, for example, the method described in Section 2.3.2 of Reference 1 described above may be used. In particular, the selection of a pair of comparison data ($P_{e0}$, $P_{e1}$) may be random or brute force.

It should be noted that selecting a pair of comparison data ($P_{e0}$, $P_{e1}$) by such learning signifies selecting automatically the pair of comparison data ($P_{e0}$, $P_{e1}$) associated with the feature having a high contribution rate in the recognition of driving behavior from the features illustrated below.

- The total of the time during which each visual region E1 to E5 is being watched or not being watched.
- Time when the visual region to be watched changes.
- The time interval between when one visual area is gazed and when another visual area is gazed.
- Change of states between two points in the same visual region at different times.
- Change of states between two points with different visual regions at different times.

In the following S18, the image processing unit 20 uses the difference value of the pair of comparison data ($P_{e0}$, $P_{e1}$) selected in S17 as an index when classifying the learning information, and generates a regression tree $RT_k$ so that a value close to the remaining correction amount $c_k$ can be obtained in all the learning information. That is, the regression function $G_k$ realized by the regression tree $RT_k$ is generated.

In the following S19, the image processing unit 20 updates the correction function $F_k$ by Expression (8) using the regression function $G_k$ generated in S18.

[Expression (8)]

$$F_k(I_E, A^{(O)}) = F_{k-1}(I_E, A^{(O)}) + \gamma \cdot G_k(I_E, A^{(O)}) \tag{8}$$

In the following S20, the image processing unit 20 increases the regression tree index k by 1.

In the following S21, the image processing unit 20 determines whether or not k>K. When a negative determination is made in S21, the process is returned to S16 in order to create a new regression tree. When an affirmative determination is made in S21, the process is ended.

In the learning process, K regression functions $G_k$ (that is, regression tree $RT_k$) are generated for one correction function $F_K$.

3-3. Behavior Recognition Process

Figure 11:
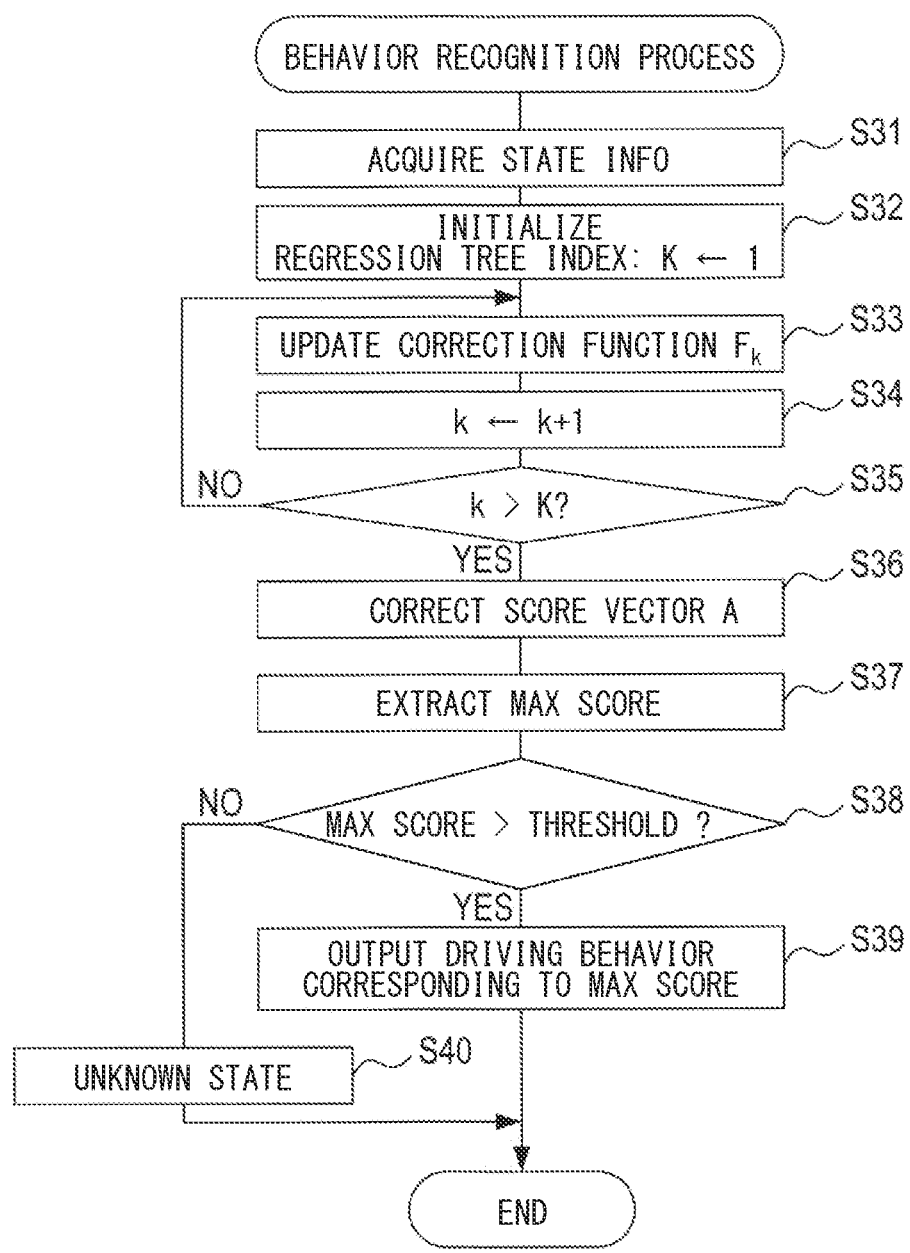
FIG. 11 is a flowchart of a behavior recognition process.

The behavior recognition process executed by the image processing unit 20 will be described with reference to the flowchart of FIG. 11. In the behavior recognition process, the behavior recognition parameter generated by the above-mentioned learning process is used. The behavior recognition process may be performed every time an image is acquired in S1, that is, every frame, or every plurality of frames.

First, in S31, the image processing unit 20 cuts out information by the time window T from the present time to the past, from the time series of multiple individual state information accumulated in S5, to thereby acquire the determination information group $I_E$.

In the following S32, the image processing unit 20 initializes the regression tree index k to 1.

In the following S33, the image processing unit 20 acquires the value of the regression function $G_k$ by using the regression tree $RT_k$ identified by the regression tree index k, the determination information group $I_E$ acquired in S31, and the behavior determination parameter calculated in the learning process, and updates the correction function $F_k$ using Expression (8).

In the following S34, the image processing unit 20 increases the regression tree index k by 1.

In the following S35, the image processing unit 20 determines whether or not k>K. That is, it is determined whether or not all of the K regression trees $RT_1$ to $RT_K$ are used in the calculation of the correction function $F_K$. When a negative determination is made in S35, the process is returned to S33. When an affirmative determination is made in S35, the process proceeds to S36. By the processing of S33 to S35, the correction function $F_K$ shown in Expression (4) is finally calculated. As shown in Expression (3), the value obtained by this correction function $F_K$ is the correction amount R with respect to the initial value $A^{(O)}$ of the score vector.

In S36, the image processing unit 20 generates the corrected score vector A using Expression (2).

In the following S37, the image processing unit 20 extracts the element having the maximum score SC from the corrected score vector A.

In the following S38, the image processing unit 20 determines whether or not SC>THs. THs is a threshold value for determining the reliability of the determination result. When an affirmative determination is made in S38, the process proceeds to S39. When a negative determination is made in S38, the process proceeds to S40.

In S39, the image processing unit 20 outputs the driving behavior associated with the element having the maximum score SC as the recognition result of the driving behavior that the driver is trying to execute, and ends the process.

In S40, the image processing unit 20 invalidates the estimation result assuming that the estimation result shown in the score vector A is unreliable and ends the process.

4. Effect

According to the embodiment described in detail above, the following effects are obtained.

(4a) In the present embodiment, the regression tree $RT_k$ learned by gradient boosting is used for calculating the correction amount R of the score vector A in the behavior recognition process. Moreover, the difference value of the pair of comparison data $(P_{e0}, P_{e1})$ is used as the parameter used for the conditional branching of the regression tree $RT_k$. That is, a simple parameter is used in recursive processing. Therefore, according to the present embodiment, the processing amount of the behavior recognition process can be reduced, and high-speed operation can be realized.

(4b) According to the present embodiment, both learning and recognition are automatically executed by machine learning. Therefore, it is possible to generate the parameter necessary for recognizing the driving behavior without requiring specialized knowledge about the driving behavior of the driver.

(4c) In the present embodiment, it is not necessary to perform preprocessing such as filtering on the state information. Therefore, it is possible to avoid the accumulation of errors due to the execution of preprocessing and the deterioration of detection accuracy due to the performance of preprocessing. It is thus possible to improve the recognition accuracy of the driver's driving behavior.

(4d) In the present embodiment, a regression function $G_k$ corresponding to the driver is generated using the regression tree $RT_k$ obtained by machine learning a large amount of data. A recognition result is obtained using the score vector A corrected by the correction value R obtained by the regression function $G_k$. Therefore, it is possible to obtain highly robust recognition results for various drivers as compared with a known technique in which recognition results are obtained by comparison with an average model.

(4e) According to the present embodiment, since the information represented by the binary value is used as the individual state information, the memory capacity required for accumulating the individual state information can be reduced.

(4f) According to the present embodiment, the driver behavior the drive is trying to execute is recognized. Therefore, the presentation of information related to the recognized driving behavior and the system control for supporting the driving behavior can be started at an early stage.

5. Other Embodiments

Although the embodiment of the present disclosure has been described above, the present disclosure is not limited to the above-described embodiment, and can be implemented in various modifications.

(5a) In the above embodiment, the pair of comparison data $(P_{e0}, P_{e1})$ which are the input information to the regression tree $RT_k$ are extracted from a plurality of individual state information generated from the driver state information. However, the present disclosure is not limited to this configuration. For example, vehicle information and peripheral information acquired via the communication unit 30 may be used as primary information, and a plurality of individual state information, which are secondary information, may be extracted from each of the primary information. Further, when the acquired primary information is binarized information, the primary information may be used as it is as the secondary information.

Figure 12:
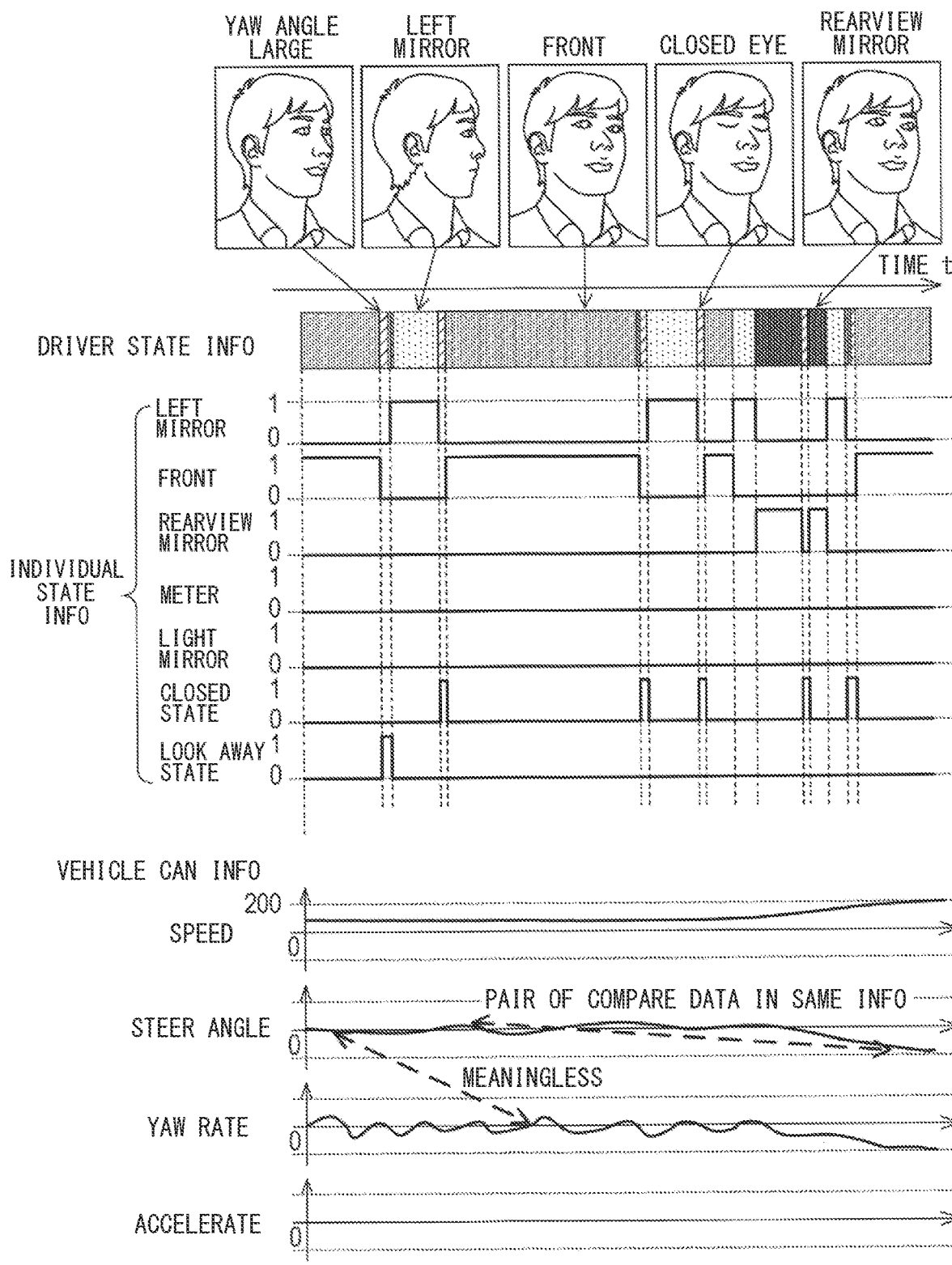
FIG. 12 is an explanatory diagram relating to vehicle information to be added to the learning data.

With reference to FIG. 12, suppose a case where analog signals that are detection results of vehicle speed, steering angle, yaw rate, acceleration, etc. are used as vehicle information. In such a case, even if a value at a certain point of time is compared with a value of other information (for example, addition or subtraction of a value), a meaningful result cannot be obtained. Therefore, when vehicle information is selected as the type of state information when generating a pair of comparison data ($P_{e0}$, $P_{e1}$), it is necessary to select two points that have the same information and are defined at different times. Suppose a case where the vehicle information is converted into a plurality of binarized information (that is, secondary information) indicating whether or not the value is within the value range for each of the plurality of divided value ranges. In such a case, a pair of comparison data ($P_{e0}$, $P_{e1}$) may be generated in combination with other state information.

(5b) In the above embodiment, a method of acquiring the regression function $G_k$ using the regression tree $RT_k$ is described. However, the present disclosure is not limited to this, and the regression function may be obtained by using another known method.

(5c) In the above embodiment, as one of the individual state information, a "driver's face looking away state" indicating a state in which the face orientation is separated from the front direction by a predetermined angle or more. However, this disclosure is not limited to this. For example, depending on the driving behavior as a recognition target to be recognized, the driver's face orientation may be divided into "rightward", "leftward", "upward", "downward", etc., and each of them may be used as separate individual state information.

(5d) The image processing unit 20 and the method thereof described in the present disclosure may be implemented by one or more than one special-purpose computer, which may be created by configuring (a) a memory and a processor programmed to execute one or more particular functions embodied in computer programs. Alternatively, the image processing unit 20 and the method thereof described in the present disclosure may be implemented by one or more than one special purpose computer, which may be created by configuring (b) a processor provided by one or more special purpose hardware logic circuits. Yet alternatively, the image processing unit 20 and the method thereof described in the present disclosure may be implemented by one or more than one special purpose computer, which may be created by configuring a combination of (a) a memory and a processor programmed to execute one or more particular functions embodied in computer programs and (b) a processor provided by one or more special purpose hardware logic circuits. The computer programs may be stored, as instructions being executed by a computer, in a tangible non-transitory computer-readable storage medium. The method for realizing the functions of each unit included in the image processing unit 20 does not necessarily include software, and all the functions may be realized by using one or a plurality of hardware circuits.

(5e) A plurality of functions possessed by one constituent element in the above embodiment may be realized by a plurality of constituent elements, or one function possessed by one constituent element may be realized by a plurality of constituent elements. Further, a plurality of functions of a plurality of constituent elements may be implemented by one constituent element, or one function implemented by a plurality of constituent elements may be implemented by one constituent element. Further, a part of the configuration of the above embodiment may be omitted. In addition, at least a part of the configuration of the above embodiment may be added or replaced with the configuration of the other above embodiment.

(5f) In addition to the above-mentioned behavior recognition apparatus and information generation apparatus, the present disclosure can also be realized in various forms. For example, it may be realized a a system including a behavior recognition apparatus or an information generation apparatus as constituent elements, or as a program for operating a computer as an image processing unit included in a behavior recognition apparatus or an information generation apparatus. Further, it may be realized as a non-transitory tangible storage medium such as a semiconductor memory in which the program is stored, a behavior recognition method, an information generation method, or the like.

For reference to further explain features of the present disclosure, the description is added as follows.

There is described a technology that generates an average model in advance for each driving behavior as a recognition target by collecting and analyzing time-series data representing the movement of the driver's line of sight, and recognizes each driving behavior by comparing the time series data detected during driving with the average model.

The model is represented by a feature vector with respect to each of visual regions, which are defined as a plurality of regions that are gazed by the driver. The respective elements of the feature vector are associated with features such as the time ratio or frequency of viewing each visual region within a predetermined time, the maximum gaze time, and the frequency of movement between visual regions. In addition, the time series data as an analysis target is also subjected to filtering processing such as noise removal.

However, as a result of detailed examination by the inventors, the following problems have been found in the above technology.

That is, in the above technology, in order to select the features that are the elements of a feature vector, it is necessary to have a high degree of specialization that can determine which feature influences the driver's behavior from the collected time series data. Further, in the above technology, the recognition performance greatly fluctuates depending on the selected features. For this reason, it has been found that it is difficult to select the features used for the determination.

Further, in the above technology, it is necessary to individually select features for each driving behavior and generate a model individually. The problem that it takes time and effort to generate a model has been also found.

It is thus desired for the present disclosure to provide a technique for easily configuring an apparatus that recognizes a driving behavior from a driver state at high speed and with high accuracy without requiring a high degree of specialization.

Aspects of the present disclosure described herein are set forth in the following clauses.

According to a first aspect of the present disclosure, a behavior recognition apparatus is provided to include an information acquisition unit, an information conversion unit, an extraction unit, an update unit, and a recognition unit.

The information acquisition unit is configured to repeatedly acquire one or more than one primary informational item including at least one informational item of three informational items, the three informational items being (i) an informational item on a state of a vehicle, (ii) an informational item on a state of a driver of the vehicle, and (iii) an informational item on a state around the vehicle. The information conversion unit is configured to extract one or more than one target state with respect to each primary informational item acquired by the information acquisition unit, and to generate a secondary informational item represented by two different values, which express respectively corresponding to the target state and not corresponding to the target state, the two different values being enabled to be added or subtracted. The extraction unit is configured to extract a determination information group using a time window from a plurality of the secondary informational items in time series generated by the information conversion unit. The update unit is configured to define a behavior vector in which elements are respectively associated with driving behaviors of the driver while giving an initial value of the behavior vector, and update the behavior vector by a correction amount of the behavior vector calculated by using the determination information group. The recognition unit is configured to recognize the driving behaviors of the driver using the behavior vector updated by the update unit.

According to a second aspect of the present disclosure, a behavior recognition method for recognizing a driver's driving behavior is provided to include an information acquisition step, an information conversion step, an extraction step, an update step, and a recognition step. The information acquisition step, the information conversion step, the extraction step, the update step, and the recognition step execute, respectively, the same operations as those in the information acquisition unit, the information conversion unit, the extraction unit, the update unit, and the recognition unit according to the first aspect.

According to such a configuration, the driving behavior of the driver can be recognized without using a model generated based on the specialized knowledge about the driving behavior of the driver. As a result, the apparatus can be easily configured without requiring specialized knowledge about the driving behavior of the driver. Since the driving behavior the driver is trying to execute can be recognized, it is possible to start presenting information on the recognized driving behavior and/or system control for supporting the driving behavior at an early stage.

According to a third aspect of the present disclosure, an information generation apparatus is provided to include an information acquisition unit and an information conversion unit. The information acquisition unit is configured to repeatedly acquire one or more than one primary informational item including at least one informational item of three informational items, the three informational items being (i) an informational item on a state of a vehicle, (ii) an informational item on a state of a driver of the vehicle, and (iii) an informational item on a state around the vehicle. The information conversion unit is configured to extract one or more than one target state with respect to each primary informational item acquired by the information acquisition unit, and to generate a secondary informational item represented by two different values, which express respectively corresponding to the target state and not corresponding to the target state, the two different values being enabled to be added or subtracted. As a result, a plurality of the secondary information as time series data are generated.

According to such a configuration, it is possible to represent the relationship between a plurality of secondary information as calculation targets by the result of adding or subtracting the signal levels of the plurality of secondary information at an optional point of time. In addition, the processing load can be reduced by using the result of the addition/subtraction calculation for calculating the correction amount used for updating the behavior vector.

What is claimed is:

1. A behavior recognition apparatus comprising:
   an information acquisition unit configured to repeatedly acquire one or more than one primary informational item including at least one informational item selected from three informational items, the three informational items being (i) an informational item on a state of a vehicle, (ii) an informational item on a state of a driver of the vehicle, and (iii) an informational item on a state around the vehicle;
   an information conversion unit configured to
      extract one or more than one target state with respect to each primary informational item acquired by the information acquisition unit, and
      generate a secondary informational item represented by two different values that express, respectively, (i) corresponding to the target state and (ii) not corresponding to the target state, the two different values being enabled to be added or subtracted;
   an extraction unit configured to extract a determination information group using a time window from a plurality of the secondary informational items in time series generated by the information conversion unit;
   an update unit configured to
      define a behavior vector in which elements are respectively associated with driving behaviors of the driver while giving an initial value of the behavior vector, and
      update the behavior vector by a correction amount of the behavior vector calculated by using the determination information group; and
   a recognition unit configured to recognize the driving behaviors of the driver using the behavior vector updated by the update unit,
   wherein:
   the update unit is further configured to
      calculate the correction amount of the behavior vector by using a regression function representing a relationship between (i) a feature amount calculated from the determination information group and (ii) the correction amount of the behavior vector, and
      use a difference value between a pair of comparison data, which are two data extracted from the determination information group, as the feature amount.

2. The behavior recognition apparatus according to claim 1, wherein:
   the regression function used by the update unit is a regression tree learned by gradient boosting and is realized as a set of weak hypotheses having a tree structure.

3. The behavior recognition apparatus according to claim 1, wherein:
   the pair of comparison data are extracted from a first secondary informational item of the secondary informational items.

4. The behavior recognition apparatus according to claim 1, wherein:
the pair of comparison data are extracted respectively from a first secondary informational item and a second secondary informational item of the secondary informational items.

5. The behavior recognition apparatus according to claim 1, wherein:
the driving behaviors respectively associated with the elements of the behavior vector include at least one behavior selected from three behaviors, the three behaviors being (i) going straight, (ii) lane changing to left, and (iii) lane changing to right.

6. The behavior recognition apparatus according to claim 1, wherein:
the primary informational item includes the informational item on the state of the driver; and
the secondary informational item includes at least one informational item selected from three informational items, the three informational items being (i) an informational item on a visual region, which is a region to be watched by the driver, (ii) an informational item on an open and closed state of eyes of the driver, and (iii) an informational item on a face orientation of the driver.

7. The behavior recognition apparatus according to claim 1, wherein:
the primary informational item includes a gaze direction of the driver as the state of the driver; and
the secondary informational item expresses corresponding to or not corresponding to the state of the driver gazing at a visual region that is a region at which the driver is gazing.

8. The behavior recognition apparatus according to claim 1, wherein:
the plurality of the secondary informational items are generated from the primary informational item; and
at an optional point of time, a first secondary informational item of the plurality of the secondary informational items is set as corresponding to the target state, while any remaining secondary informational item of the plurality of the secondary informational items other than the first secondary informational item is set as not corresponding to the target state.

9. The behavior recognition apparatus according to claim 1, further comprising:
one or more than one memory; and
one or more than one processor communicably coupled to the memory, the processor being configured to implement the information acquisition unit, the information conversion unit, the extraction unit, the update unit, and the recognition unit.

10. A behavior recognition apparatus comprising:
one or more than one memory; and
one or more than one processor communicably coupled to the memory, the processor being configured to:
acquire repeatedly one or more than one primary informational item including at least one informational item selected from three informational items, the three informational items being (i) an informational item on a state of a vehicle, (ii) an informational item on a state of a driver of the vehicle, and (iii) an informational item on a state around the vehicle;
extract one or more than one target state with respect to each primary informational item acquired, and generate a secondary informational item represented by two different values that express, respectively, (i) corresponding to the target state and (ii) not corresponding to the target state, the two different values being enabled to be added or subtracted;
extract a determination information group using a time window from a plurality of the secondary informational items generated in time series;
define a behavior vector in which elements are respectively associated with driving behaviors of the driver while giving an initial value of the behavior vector;
update the behavior vector by a correction amount of the behavior vector calculated by using the determination information group; and
recognize the driving behaviors of the driver using the behavior vector updated,
wherein:
in updating the behavior vector,
the correction amount of the behavior vector is calculated by using a regression function representing a relationship between (i) a feature amount calculated from the determination information group and (ii) the correction amount of the behavior vector; and
a difference value between a pair of comparison data, which are two data extracted from the determination information group, is used as the feature amount.

11. A behavior recognition method that recognizes a driving behavior of a driver of a vehicle, the method being implemented by one or more than one processor, the method comprising:
acquiring repeatedly one or more than one primary informational item including at least one informational item selected from three informational items, the three informational items being (i) an informational item on a state of a vehicle, (ii) an informational item on a state of a driver of the vehicle, and (iii) an informational item on a state around the vehicle;
extracting one or more than one target state with respect to each primary informational item acquired;
generating a secondary informational item represented by two different values, which express, respectively, (i) corresponding to the target state and (ii) not corresponding to the target state, the two different values being enabled to be added or subtracted;
extracting a determination information group using a time window from a plurality of the secondary informational items generated in time series;
defining a behavior vector in which elements are respectively associated with driving behaviors of the driver while giving an initial value of the behavior vector;
updating the behavior vector by a correction amount of the behavior vector calculated by using the determination information group; and
recognizing the driving behaviors of the driver using the behavior vector updated,
wherein:
in updating the behavior vector,
the correction amount of the behavior vector is calculated by using a regression function representing a relationship between (i) a feature amount calculated from the determination information group and (ii) the correction amount of the behavior vector, and
a difference value between a pair of comparison data, which are two data extracted from the determination information group, is used as the feature amount.

* * * * *